(12) United States Patent
Teuwen

(10) Patent No.: US 8,990,519 B2
(45) Date of Patent: Mar. 24, 2015

(54) ELECTRONIC COMPONENT

(75) Inventor: Philippe Teuwen, Ixelles (BE)

(73) Assignee: Quotainne Enterprises LLC, Wilmington, DE (US)

( * ) Notice: Subject to any disclaimer, the term of this patent is extended or adjusted under 35 U.S.C. 154(b) by 380 days.

(21) Appl. No.: 13/306,835

(22) Filed: Nov. 29, 2011

(65) Prior Publication Data

US 2012/0137088 A1 May 31, 2012

(30) Foreign Application Priority Data

Nov. 30, 2010 (EP) .................................... 10193204

(51) Int. Cl.
*G06F 12/00* (2006.01)
*G06F 21/62* (2013.01)
*G06F 17/50* (2006.01)

(52) U.S. Cl.
CPC .............. *G06F 21/629* (2013.01); *G06F 17/50* (2013.01)
USPC .................... 711/154; 711/103; 711/E12.001

(58) Field of Classification Search
CPC ......... G06F 12/00; G06F 17/50; G06F 21/00; G06F 21/629
USPC .................................. 711/103, 154, E12.001
See application file for complete search history.

(56) References Cited

U.S. PATENT DOCUMENTS

| 6,904,527 | B1 | 6/2005 | Parlour et al. | |
| 7,683,663 | B1 | 3/2010 | Tsai | |
| 8,117,350 | B2 * | 2/2012 | Watkins et al. | 710/9 |
| 2007/0288779 | A1 | 12/2007 | Kim | |
| 2011/0106981 | A1 * | 5/2011 | Watkins et al. | 710/9 |

FOREIGN PATENT DOCUMENTS

| CN | 101075156 | 11/2007 |
| EP | 1 528 454 A2 | 5/2005 |
| WO | 98/58327 A1 | 12/1998 |
| WO | 2009/073969 A1 | 6/2009 |

* cited by examiner

*Primary Examiner* — Pierre-Michel Bataille
(74) *Attorney, Agent, or Firm* — Michael H. Lyons

(57) ABSTRACT

An electronic component is provided having a plurality of functionalities. The electronic component comprises a control logic, and a non-volatile storage element. The control logic is coupled to the non-volatile storage element and is adapted for storing values in the non-volatile storage element based on an external input signal to the electronic component, each value being indicative for one or more functionalities of the plurality of functionalities. The control logic is adapted for controlling the availability of the plurality of functionalities based on one or more values stored in the non-volatile storage element and for outputting a confirmation signal being indicative for the availability of the plurality of functionalities.

18 Claims, 2 Drawing Sheets

ELECTRONIC COMPONENT

CROSS-REFERENCE TO RELATED APPLICATIONS

This application claims the priority under 35 U.S.C. §119 of European patent application no. 10193204.4, filed on Nov. 30, 2010, the contents of which are incorporated by reference herein.

FIELD OF THE INVENTION

The invention relates to an electronic component having a plurality of functionalities.

Beyond this, the invention relates to a method of controlling the availability of a plurality of functionalities provided by an electronic component.

Furthermore, the invention relates to a program element.

BACKGROUND OF THE INVENTION

In the field of chip manufacturing, a chip may comprise a plurality of features. Customers may ask for chips with different number of features. Chip manufacturers have then the possibility to produce different kinds of chips. Sometimes, they are offering a licensing scheme where all customers get the most advanced version of a chip but they are offered to pay depending on how many features they are actually using. This is made possible because the extra cost for the manufacturer is counter-balanced by an easier book ordering and stock management. A problem hereby is to know exactly what the customer is using in every single chip and this deal of paying for what is actually used might be based only on trust.

OBJECT AND SUMMARY OF THE INVENTION

It is an object of the invention to provide an electronic component, which may be produced in a cheap and easy way, and wherein the available features may be controlled.

In order to achieve the object defined above, an electronic component having a plurality of functionalities, a method of controlling the availability of a plurality of functionalities provided by an electronic component and a program element according to the independent claims are provided.

According to an exemplary embodiment of the invention, an electronic component having a plurality of functionalities is provided, wherein the electronic component comprises a control logic and a non-volatile storage element. The control logic is coupled to the non-volatile storage element and is adapted for storing values in the non-volatile storage element based on an external input signal, each value being indicative for one or more functionalities of the plurality of functionalities, and the control logic is adapted for controlling the availability of the plurality of functionalities based on one or more values stored in the non-volatile storage element and for outputting a confirmation signal being indicative for the availability of the plurality of functionalities.

According to another exemplary embodiment of the invention, a method of controlling the availability of a plurality of functionalities provided by an electronic component is provided. The method comprises storing, by a control logic, of one or more values in a non-volatile storage element coupled to the control logic based on an external input signal, each value being indicative for one or more functionalities of the plurality of functionalities, controlling, by the control logic, of the availability of the plurality of functionalities based on one or more values stored in the non-volatile storage element, and outputting a confirmation signal being indicative for the availability of the plurality of functionalities.

According to still another exemplary embodiment of the invention, a program element (for instance a software routine, in source code or in executable code) is provided, which, when being executed by a processor, is adapted to control or carry out a controlling method having the above mentioned features.

Controlling the availability of a plurality of functionalities provided by an electronic component, which may be performed according to embodiments of the invention, can be realized by a computer program that is by software, or by using one or more special electronic optimization circuits, that is in hardware, or in hybrid form, that is by means of software components and hardware components.

The term "electronic component" may denote any kind of integrated circuit or chip which may be used in microprocessors, microcontrollers, RFID microprocessors or RFID tags, DSPs (digital signal processor), FPGAs (field programmable grid array), etc.

Such an electronic component may provide a plurality of functionalities or features, for example the amount or kind of memory space (banks, slots, RAM, EEPROM . . . ), the CPU high speeds, crypto accelerators, etc. The availability of these functionalities may be controlled, that means the functionalities may be enabled or disabled for the user.

The term "control logic" may denote a unit, which may be used for executing a sequence of stored instructions, also called program. Further, the control logic may store values, for example bits, in the non-volatile storage element to specify, which part or selection of the plurality of functionalities should be available or not, i.e. should be disabled or enabled. The control logic may be a single unit or part of a unit. The control logic may be for example the CPU of the electronic component.

The term "non-volatile storage element" may denote a computer memory that can retain the stored information even when not powered. The non-volatile storage element may provide the advantage that it may be used for the task of secondary storage, or long-term persistent storage. For example it may be a processor register or general purpose register. This may be a small amount of storage available on the CPU whose contents can be accessed more quickly than storage available elsewhere.

Values may be stored in the non-volatile storage element, for example in binary or hexadecimal form. Each value may be indicative for one or more functionalities. The non-volatile storage element may comprise references, for example pointer, to the respective functionalities or to a memory comprising instructions to be executed for enabling or disabling the functionalities. The non-volatile storage element may comprise also itself instructions to be executed for controlling the availability of the plurality of functionalities.

The external input signal may be for example a key generated by the manufacturer and inputted by the customer. The confirmation signal may be any kind of signal comprising information about the availability of the plurality of functionalities. This signal may be used to proof that some functionalities have been disabled or enabled.

In the following, further exemplary embodiments of the device will be explained. However, these embodiments also apply to the method, to the program element and to the computer-readable medium.

The non-volatile storage element may be a processor register. This may mean that it is part of the control logic or CPU. In the following, the term "register" may also refer to a "non-volatile storage element".

The register may be a memory-mapped register. The specific address of the register may be stored in this case in a known memory location.

What is referred above as storing values in the register or non-volatile storage element may be also an extension of the existing instruction set of the processor or any kind of input signal, i.e. triggering the execution of the above mentioned steps for controlling the availability of the plurality of functionalities and remembering that choice by means of non-volatile elements.

The register may be a write-once register. The values may be stored in the register only once. After this storing or writing step, the register may only be read. This is also called write-once read-many. This may provide the advantage that a customer may buy the chip and, after selecting the desired functionalities, may configure the chip once without the possibility to change it later. Based on this, the manufacturer may fix a price for the chip and can be sure that it is not possible to change the configuration later on.

The control logic may comprise a first control logic unit and a second control logic unit, wherein the first control logic unit may be adapted for receiving the external input signal and for storing one or more values in the non-volatile storage element based on the input signal, and wherein the second control logic unit may be adapted for controlling the availability of the plurality of functionalities based on the one or more stored values.

The first and the second control logic units may be single units or may be part of one unit, for example the CPU.

The second control logic may be adapted for disabling the availability of specific functionalities of the plurality of functionalities based on the one or more stored values. In this embodiment, the customer or consumer may buy a chip with all possible features enabled. After selecting the desired features, for example based on the specific intended use, the customer may make an input to the electronic component. The first control logic unit may receive the input signal and may then store values indicative for the selected or the unselected functionalities in the register. The register may then for example send a signal to the second control logic unit comprising instructions to be executed for disabling the selected functionalities. The second control logic unit may execute such instructions itself and/or may write to a memory for disabling functionalities.

The electronic component may further comprise electronic elements being adapted to be activated for disabling the availability of specific functionalities of the plurality of functionalities based on an output signal of the second control logic unit. The electronic elements may be coupled to the second control logic unit.

At least one of the electronic elements may be a fuse. The fuse may melt for disabling a connection, which would be necessary to provide a functionality which is not selected. The electronic elements may also comprise transistors.

The register, for example based on fuses, may allow to be written multiple times but always to disable even more functionalities (by melting corresponding fuses), making not possible to re-enable those functionalities.

The control logic may comprise a third control logic unit coupled to the non-volatile storage element and being adapted for receiving a signal being indicative for the stored values. The third control logic unit may be a single unit or may be part of one unit together with the first and the second control logic unit, for example be a part of the CPU.

The electronic component may further comprise a memory, wherein a plurality of predetermined keys is stored in the memory, each key being indicative for one or more functionalities of the plurality of functionalities, wherein the third control logic unit is coupled to the memory and is adapted for retrieving one key of the plurality of predetermined keys being indicative for the specific functionalities and for outputting it out of the electronic component. The customer may prove based on the key which functionalities are active and which are disabled. The keys may be stored in a hidden map of keys.

The third control logic unit may be adapted for generating a key based on the specific functionalities. The key may be encrypted based on any common algorithm.

The key may be further based on an ID of the electronic component, a predetermined key stored in the electronic component, and/or the one or more values stored in the register. With such a combination it may be very difficult to generate the key externally, i.e. without having disabled some of the functionalities.

The second control logic unit may be adapted for enabling the availability of specific functionalities of the plurality of functionalities based on the one or more stored values. In this embodiment, the customer may buy a chip with all possible features disabled. After selecting the desired features, for example based on the specific intended use, the customer may make an input to the electronic component. The first control logic unit may receive the input signal and may then store values indicative for the selected or the unselected functionalities in the register or non-volatile storage element. The register may then for example send a signal to the second control logic unit comprising instructions to be executed for enabling the selected functionalities or may execute such instructions itself.

The first control logic unit may be adapted for storing the one or more values based on an external input signal. This external input signal may be for example a key generated by the manufacturer and inputted by the customer. In this embodiment, the customer may pay for the key comprising information about the functionalities to be enabled.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
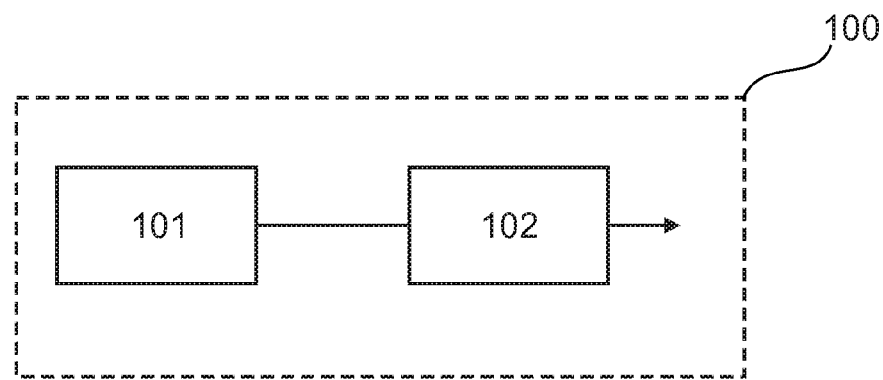
FIG. 1 illustrates an electronic component according to an exemplary embodiment of the invention.

The illustration in the drawing is schematically. In different drawings, similar or identical elements are provided with the same reference signs.

Chip manufacturers have usually several versions of complex chips such as microprocessors to satisfy a wide range of customers. While this aims at targeting less demanding customers with less powerful versions and customers eager to pay more for more powerful versions, this system has some limits as it makes more complex the production and stock management on the producer side but also on the customer side who does not necessarily know in advance what will be its final need and balanced between buying more expensive chips which are at the end too powerful or cheaper chips which are, even worse, unusable for the targeted application because too limited. In this context, one possibility may be a licensing scheme where all customers get the most advanced version of the chips but they are offered to pay depending on how many features they are actually using. This may be possible because the extra cost for the manufacturer is counter-balanced by an easier book ordering and stock management. One problem in this context is how to know exactly what the customer is using in every single chip. One way of paying for what actually is used is only based on trust.

Exemplary embodiments of the invention aims at providing a cheap way to solve this problem, which is usable offline, in other words, which does not require an online communication between the customer's production line and the chip manufacturer.

FIG. 1 illustrates an electronic component or chip 100 having a plurality of functionalities according to an exemplary embodiment of the invention. The electronic component 100 comprises a control logic 101 and a non-volatile storage element 102. The non-volatile storage element may be a register. The register, also called functionality register, may be writable once only. Throughout the following description, the term register may also refer to a non-volatile storage element.

The electronic component may provide functionalities which may enabled or disabled by the register, like memory space (banks, slots, RAM, EEPROM . . . ), CPU high speeds, crypto accelerators, etc. The functionalities may be controlled in different ways. For instance, control mechanisms for disabling part or all of a given functionality may be limiting access to the lowest parts of the memory (e.g. a 4 kb memory could be limited to 3 kb, 2 kb, 1.5 kb, 1 kb, etc.), limiting which highest CPU frequency can be used, disabling a hardware accelerator, etc.

The register content may lock down part of the chip features, or vice versa as explained above. In the first alternative, the customer may get the chips which have all functionalities available. The customer is then free to develop his product and to choose, if he wants, to lock down some unused functionalities. To do so, he writes the required value in the functionality register which has the effect that some of the functionalities are locked down or are disabled.

In the second alternative, the functionality register may be constructed in a way to allow unlocking of functionalities. That means that the customer buys a locked down chip and later he can buy functionalities for a given chip for which he gets for example diversified functionality keys from the manufacturer. The functionality key may become then a way for the chip to validate the new functionality register value and to free some functionalities. The key may be inputted as input signal for storing the values in the register.

Figure 2:
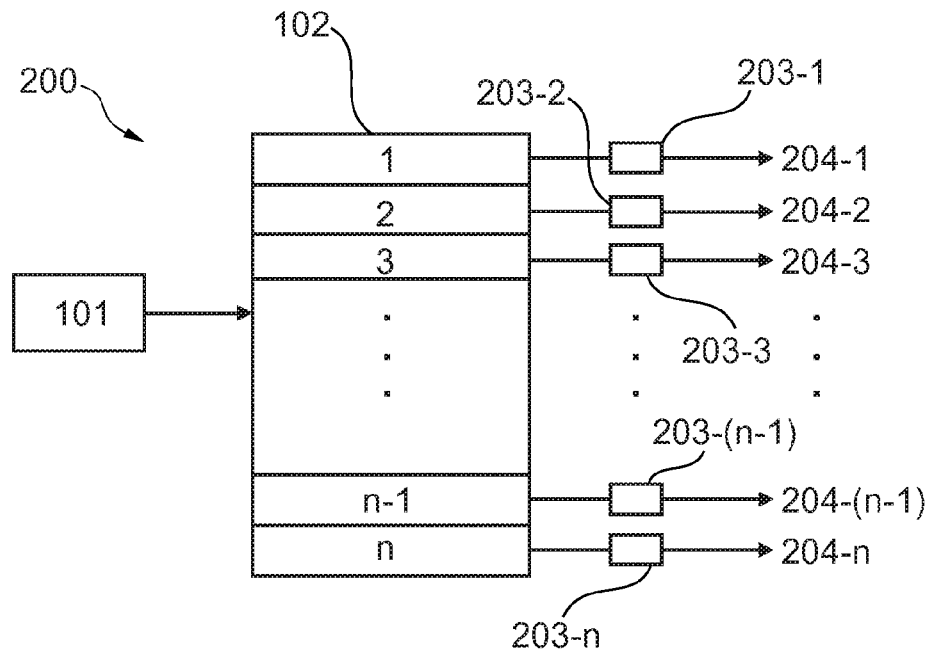
FIG. 2 illustrates an electronic component according to a further exemplary embodiment of the invention.

FIG. 2 illustrates a further exemplary embodiment of the invention. The electronic component 200 comprises a control logic 101 and a register 102 coupled to the control logic. The register comprises register segments 1, 2, 3, . . . , n−1, n. In each segment, a value may be stored being indicative for one or more functionalities provided by the electronic component.

The register or functionality register 102 may be a memory-mapped or any other mechanism such as for example a special instructions set. In one embodiment, the functionality register can be written multiple times, but always to lock down more functionalities, never to free functionalities. It can for instance be configured in a way such that each bit of the register written to one is one functionality being disabled. In this case, the bits may be represented by electronic elements, 203-1, 203-2, 203-3, . . . , 203-(n−1), 203-n, like fuses, coupled to the register or being part of the register. In the case of fuses, only bits=1 may be written and never been set back to 0 as the fuses are melted.

Each entry of the register may be associated with one functionality or more than one functionality, 204-1, 204-2, 204-3, . . . , 204-(n−1), 204-n. When a value has been written into register entry 1, the associated functionality 204-1 may be, depending on the embodiment, enabled or disabled. This may be performed by the electronic element n203-1.

Enabling or disabling of functionalities may be performed by enabling or disabling a connection within the electronic component. With this connection, the specific functionality may be connected and therefore may be made available, or the specific functionality may be disconnected and therefore may be made unavailable. It may be also possible that the register entries comprise pointer to specific instructions to be executed or comprise the instructions itself.

Figure 3:
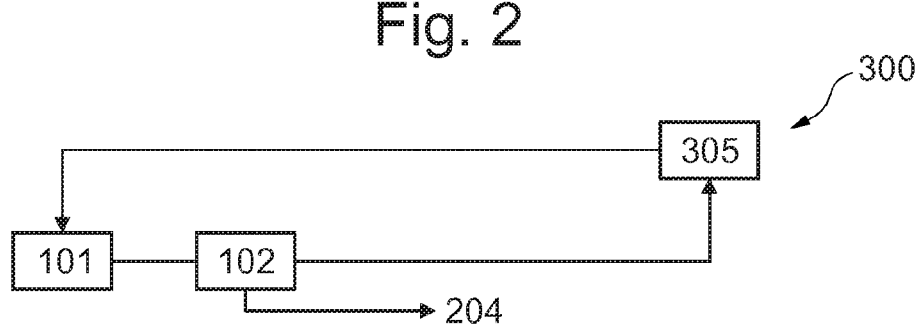
FIG. 3 illustrates an electronic component according to a further exemplary embodiment of the invention.

FIG. 3 illustrates a further exemplary embodiment of the electronic component 300 according to the invention. The electronic component comprises a control logic 101 and a register 102 coupled to the control logic. The electronic component comprises further a memory 305 being coupled between the control logic and the register. The memory 305 may comprise for example a map or plurality of keys. The register may also be part of the memory. The memory may receive a signal from the control logic being indicative for functionalities having been locked down.

The register may make accessible one single key out of the keys map, which may be hidden, i.e. be invisible for any user. The memory may send the key to the control logic, which may be adapted to output the key. This key may be returned later to the manufacturer as a proof of having locked down some of the functionalities and can be understood as a voucher for a better chip price.

According to this embodiment, the chip contains a hidden map of keys and a write-only-once register which has two purposes: The register content will lock down part of the chip features and will make accessible one single key out of the hidden keys map. Only one functionality key will become readable. The invention allows a secure deployment of chip pricing based on the actual usage by the customer in a light and offline way.

The elements are linked together, for example like shown in the following table:

| Func. register value | Func. keys map | Functionalities locking |
|---|---|---|
| 0x01 | 0x1234 | Only X kb of memory available |
| 0x02 | 0x5678 | CPU speed < Y MHz |
| 0x03 | 0xABCD | X kb of memory available & CPU speed < Y MHz |
| 0x04 | 0xEF12 | Advanced Encryption Standard Hardware accelerator disabled |
| . . . | . . . | . . . |

The manufacturer may associate a number of keys with a chip and store the keys into the keys map of the chip. When one or more functionalities are selected by the customer and written into the register by the control logic, the register frees one of the functionality keys which become readable by the customer. The customer can then transmit all the functionality keys of all the chips used in production to claim some rebates, vouchers, lower prices, . . . to the manufacturer. The manufacturer can then verify the keys, retrieve how many functionalities are really used by the customer and set the appropriate financial operation with the customer. Chips for which the manufacturer does not receive any key from the customer can be considered as running all functionalities and therefore being sold at the highest price.

In the following, further embodiments of the invention are presented. The functionality key can be returned via the same register, another register, a memory-mapped register, a memory area or any other mechanism. Instead of a hardcoded map of functionality keys, keys could be derived by the chip from its unique ID, the register value and a manufacturer key, diversified or not. This should be done in a secure way so that the customer cannot "invent" the keys corresponding to for example a all-locked-down chip and pay less. If the manufacturer key is not diversified, this may allow to skip completely the chip personalization (apart from its ID).

When generating a key some security considerations should be undertaken. The physical security of the keys map might not very important because the price to retrieve the keys will be very rapidly larger than the price difference between an open version of the chip and a locked-down version of the chip.

The strength (number of bits) of a single functionality key is also not critical at all because, if the customer tries to guess the key of a cheaper version, he might not have any way of verifying his guess else than returning the key to the manufacturer who may detect immediately any attempt of trickery.

There is a possibility of collision between keys of the same map in the same chip. This can be avoided in the manufacturing process (e.g. a few bits as index, together with a MAC (message authentication code) of a few more bits) or taken into account: the customer would then be offered to pay the cheapest version between two versions with the same validation key and the manufacturer knows that there is a certain probability that the customer will pay one single chip every hundreds or thousands, cheaper than it should, which becomes rapidly neglectible.

The diversification of keys between different chips should be good otherwise if the customer manages to reverse-engineer the link between chip ID, functionality register value and functionality key, then the manufacturer is doomed to sell all chips at the lowest price.

Figure 4:
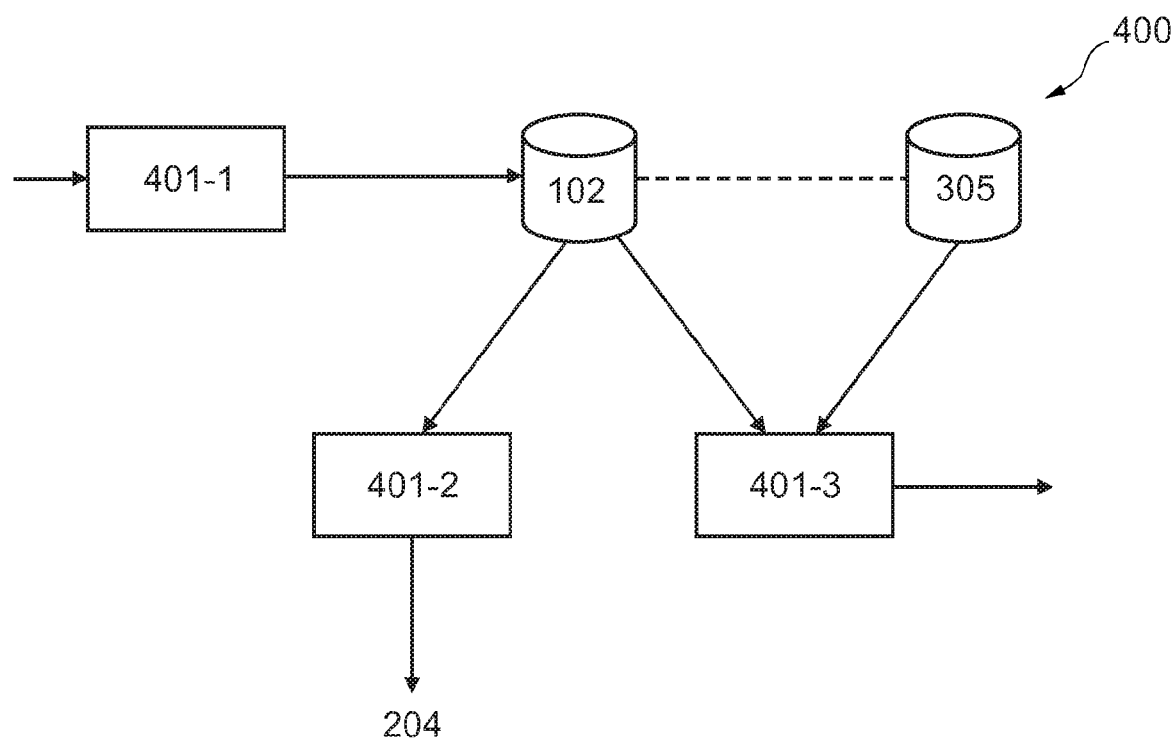
FIG. 4 illustrates an electronic component according to a further exemplary embodiment of the invention.

FIG. 4 illustrates a further exemplary embodiment of an electronic component 400 according to the invention. In this embodiment, the control logic comprises three control logic units 401-1, 401-2, 401-3. The first control logic unit 401-1 receives the external input signal and writes the values specifying the desired functionalities into the non-volatile storage element or register 102. The register then sends a signal to the second control logic unit 401-2 comprising information about the functionalities to be disabled or enabled. The second control logic unit then disables or enables the desired functionalities. The register 102 also sends a signal to the third control logic unit comprising information about the selected functionalities.

In one embodiment, the third control logic unit 401-3 retrieves a key from the memory 305 and outputs the key. In a second embodiment, the third control logic unit 401-3 generates a key based on the signal received from the register 102 and some further information retrieved from the memory, for example an ID of the electronic component. The memory 305 and the register 102 may also be coupled. In this case, the register 102 may send a signal comprising information about the selected features to the memory for unlocking a key being indicative for the selected features.

In one embodiment, the control logic units may be part of the CPU. Also the non-volatile storage element may be part of the CPU. In this embodiment, the CPU may be responsible for all actions, including storing values, disabling or enabling functionalities and outputting a key.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. An electronic component having a plurality of functionalities, the electronic component being a chip and comprising:
    a control logic, and
    a non-volatile storage element, wherein the control logic is coupled to the non-volatile storage element and is adapted for storing values in the non-volatile storage element based on an external input signal to the electronic component, each value being indicative for one or more functionalities of the plurality of functionalities, wherein the control logic is adapted for controlling the availability of the plurality of functionalities based on one or more values stored in the non-volatile storage element and for outputting a confirmation signal being indicative for the availability of the plurality of functionalities, wherein the control logic comprises a first control logic unit and a second control logic unit, the first control logic unit adapted for receiving the external input signal and for storing one or more values in the non-volatile storage element based on the input signal, and the second control logic unit adapted for controlling the availability of the plurality of functionalities based on the one or more stored values.

2. The electronic component according to claim 1, wherein the non-volatile storage element is a processor register.

3. The electronic component according to claim 1, wherein the non-volatile storage element comprises at least one of a memory-mapped register and a write-once register.

4. The electronic component according to claim 1, wherein the second control logic unit is adapted for disabling the availability of specific functionalities of the plurality of functionalities based on the one or more stored values.

5. The electronic component according to claim 4, further comprising electronic elements being adapted to be activated for disabling the availability of specific functionalities of the plurality of functionalities based on an output signal of the second control logic unit.

6. The electronic component according to claim 5, wherein at least one of the electronic elements is a fuse.

7. The electronic component according to claim 4, wherein the control logic comprises a third control logic unit coupled to the non-volatile storage element and being adapted for receiving a signal being indicative for the stored values.

8. The electronic component according to claim 7, further comprising:
    a memory, wherein a plurality of predetermined keys is stored in the memory, each key being indicative for one or more functionalities of the plurality of functionalities, and wherein the third control logic unit is coupled to the memory and is adapted for retrieving one key of the plurality of predetermined keys being indicative for the specific functionalities and for outputting the key as the confirmation signal out of the component.

9. The electronic component according to claim 7, wherein the third control logic unit is adapted for generating a key based on the specific functionalities and for outputting the key as the confirmation signal out of the component.

10. The electronic component according to claim 9, wherein the key is further based on at least one of an ID of the electronic component, a predetermined key stored in the electronic component, and the one or more values stored in the non-volatile storage element.

11. The electronic component according to claim 1, wherein the second control logic is adapted for enabling the availability of specific functionalities of the plurality of functionalities based on the one or more stored values.

12. The electronic component defined in claim 1, wherein the control logic comprises:
   a first control logic unit adapted for enabling the availability of specific functionalities of the plurality of functionalities based on the one or more stored values; and
   a second control logic unit adapted for generating a key based on the specific functionalities and for outputting the key as the confirmation signal from the electronic component.

13. The electronic component defined in claim 1, wherein the control logic comprises:
   a first control logic unit adapted for disabling the availability of specific functionalities of the plurality of functionalities based on the one or more stored values; and
   a second control logic unit adapted for generating a key based on the specific functionalities and for outputting the key as the confirmation signal from the component, wherein the electronic component further comprises:
      memory coupled to the second control logic unit, wherein a plurality of predetermined keys is stored at the memory, wherein each of the predetermined keys is indicative of one or more functionalities of the plurality of functionalities, and wherein the second control logic unit is adapted for retrieving a given key of the plurality of predetermined keys that is indicative of the specific functionalities and for outputting that key as the confirmation signal from the electronic component.

14. The electronic device defined in claim 1, wherein the control logic and the non-volatile storage element are each formed on a common integrated circuit.

15. An electronic component having a plurality of functionalities, the electronic component being a chip and comprising:
   a control logic, and
   a non-volatile storage element, wherein the control logic is coupled to the non-volatile storage element and is adapted for storing values in the non-volatile storage element based on an external input signal to the electronic component, each value being indicative for one or more functionalities of the plurality of functionalities, wherein the control logic is adapted for controlling the availability of the plurality of functionalities based on one or more values stored in the non-volatile storage element and for outputting a confirmation signal being indicative for the availability of the plurality of functionalities, wherein the control logic comprises:
      a first control logic unit adapted for performing at least one of disabling and enabling the availability of specific functionalities of the plurality of functionalities based on the one or more stored values; and
      a second control logic unit adapted for generating a key based on the specific functionalities and for outputting the key as the confirmation signal from the electronic component.

16. A method of controlling the availability of a plurality of functionalities provided by an electronic component, the electronic component being a chip, and the method comprising:
   storing, by a control logic, of one or more values in a non-volatile storage element coupled to the control logic based on an external input signal, each value being indicative for one or more functionalities of the plurality of functionalities,
   controlling, by the control logic, of the availability of the plurality of functionalities based on one or more values stored in the non-volatile storage element, and
   outputting a confirmation signal being indicative for the availability of the plurality of functionalities, wherein the plurality of functionalities comprises a plurality of processor speeds associated with the electronic component and controlling the availability of the plurality of functionalities comprises controlling which processor speed of the plurality of processor speeds is available for the electronic component.

17. A program element of controlling the availability of a plurality of functionalities provided by an electronic component, the electronic component being a chip, wherein the program element, when being executed by a processor, is adapted to carry out or control a method according to claim 16.

18. The method defined in claim 16, wherein the confirmation signal output by the control logic is indicative of which of the plurality of functionalities are available to the electronic component after the values have been stored in the non-volatile storage element by the control logic.

* * * * *